US010479241B2

(12) United States Patent
Filipkowski et al.

(10) Patent No.: US 10,479,241 B2
(45) Date of Patent: Nov. 19, 2019

(54) AUTOMOTIVE SEATBACK AIR VENT (71) Applicant: NIO USA, Inc., San Jose, CA (US)

(72) Inventors: Matthew S. Filipkowski, Pleasanton, CA (US); Colin J. Stevens, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 6 days.

(21) Appl. No.: 15/704,948

(22) Filed: Sep. 14, 2017

(65) Prior Publication Data
US 2019/0077286 A1 Mar. 14, 2019

(51) Int. Cl.
B60N 2/56 (2006.01)
B60H 1/00 (2006.01)
B60N 2/58 (2006.01)
B60H 1/24 (2006.01)
B60N 2/01 (2006.01)
B60N 2/68 (2006.01)
B60N 2/06 (2006.01)
B60N 2/07 (2006.01)
B60N 2/22 (2006.01)

(52) U.S. Cl.
CPC ....... B60N 2/5628 (2013.01); B60H 1/00271 (2013.01); B60H 1/242 (2013.01); B60H 1/244 (2013.01); B60N 2/01 (2013.01); B60N 2/06 (2013.01); B60N 2/0747 (2013.01); B60N 2/22 (2013.01); B60N 2/2222 (2013.01); B60N 2/5621 (2013.01); B60N 2/58 (2013.01); B60N 2/68 (2013.01)

(58) Field of Classification Search
CPC ............ B60H 1/00028; B60H 1/00271; B60H 1/00285; B60H 1/241; B60H 1/242; B60H 1/244; B60N 2/00; B60N 2/02; B60N 2/5628; B60N 2/5642; B60N 2/58
USPC .................................. 296/63, 64, 65.01, 208
See application file for complete search history.

(56) References Cited

U.S. PATENT DOCUMENTS 2,430,335 A * 11/1947 Hart ................... B60H 1/00207
454/120
2,760,347 A 8/1956 Dolza
2,780,077 A 2/1957 Jacobs
4,258,555 A * 3/1981 Scharm ............. B60H 1/00007
62/244
4,531,453 A * 7/1985 Warman ............... B60H 3/0608
454/139

(Continued)

FOREIGN PATENT DOCUMENTS

DE 102009057870 6/2011
EP 0217752 4/1987

(Continued)

OTHER PUBLICATIONS

U.S. Appl. No. 15/898,077, filed Feb. 15, 2018, Ren et al.

(Continued)

Primary Examiner — Jason S Daniels
(74) Attorney, Agent, or Firm — Sheridan Ross P.C.

(57) ABSTRACT

A fixed frame supports a movable seat structure. The movable seat structure is configured to move relative to the fixed frame. An air duct supported by the fixed frame supplies an air vent positioned on a rearward side of the fixed frame with air. Movement of the movable seat structure relative to the fixed frame has no effect on the position or orientation of the air vent.

20 Claims, 8 Drawing Sheets (56) References Cited

U.S. PATENT DOCUMENTS

| | | | | |
|---|---|---|---|---|
| 4,840,115 | A | * | 6/1989 | Johnson ............... B60H 1/247 454/120 |
| 4,852,638 | A | | 8/1989 | Hildebrand et al. |
| 5,305,613 | A | | 4/1994 | Hotta et al. |
| 5,385,382 | A | * | 1/1995 | Single, II ............... A47C 7/74 297/180.13 |
| 5,733,189 | A | | 3/1998 | Eastwood |
| 6,986,385 | B1 | | 1/2006 | Gilles et al. |
| 7,100,675 | B2 | | 9/2006 | Yamamoto et al. |
| 2003/0107241 | A1 | | 6/2003 | Ritchie et al. |
| 2008/0053126 | A1 | * | 3/2008 | Ebigt ....................... B60N 2/24 62/237 |
| 2012/0090814 | A1 | | 4/2012 | Crosier et al. |
| 2013/0257126 | A1 | * | 10/2013 | Freisleben ........... B60N 2/0232 297/311 |
| 2015/0028634 | A1 | * | 1/2015 | Scherello ............ B60N 2/5621 297/163 |
| 2017/0087958 | A1 | * | 3/2017 | Nishina .............. B60H 1/00285 |
| 2017/0106721 | A1 | | 4/2017 | Hoke et al. |

FOREIGN PATENT DOCUMENTS

| | | |
|---|---|---|
| EP | 2873553 | 5/2015 |
| FR | 2667829 | 4/1992 |
| WO | WO 2009/069148 | 6/2009 |

OTHER PUBLICATIONS

Official Action for U.S. Appl. No. 15/630,291, dated Mar. 21, 2018, 27 pages.

U.S. Appl. No. 15/630,291, filed Jun. 22, 2017, Filipkowski, et al.

"Porsch 944 HVAC Operation and Malfunctions," Clarks-Garage.com, retrieved from http://www.clarks-garage.com/shop-manual/hvac-01.htm, retrieved on May 8, 2017, 1 page.

Official Action for U.S. Appl. No. 15/630,291, dated Oct. 3, 2018, 25 pages.

Official Action for U.S. Appl. No. 15/630,291, dated Feb. 7, 2019, 30 pages.

* cited by examiner

AUTOMOTIVE SEATBACK AIR VENT

FIELD

The present disclosure is generally directed to vehicle air conditioning systems, and more particularly to an automotive seatback air vent.

BACKGROUND

Heating, ventilation, and cooling ("HVAC") systems have long been included in automobiles, whether as standard or optional equipment. Such systems typically comprise an HVAC module, which receives air, conditions the air as necessary (whether by heating or cooling, although in some instances no conditioning is needed or effected), mixes the air as necessary (e.g., mixes cooled air with fresh air or warm air with fresh air to achieve a desired air temperature), and blows the air through one or more ducts to one or more vents in the passenger cabin of the vehicle. HVAC modules thus selectively provide air, for example, to dashboard-mounted or dash-level vents, ceiling and sidewall mounted vents, floor-mounted or foot-level vents, and defrosting vents.

European Patent Publication No. EP 2873553, entitled "Vehicle Seat Ventilation System," describes an air vent that is integrated into the back panel of a vehicle seat back. U.S. Pat. No. 5,385,382, entitled "Combination Seat Frame and Ventilation Apparatus," describes a seat frame apparatus having a sealed duct capable of directing the flow of air. European Patent Publication No. EP 0217752, entitled "Air-Conditioned Device for Passenger Compartments of Motor Vehicles," describes an electric fan incorporated into a motor vehicle seat and arranged to generate air flow through an opening in the rear part of the seat. Each of these references is hereby incorporated by reference herein, in its entirety.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
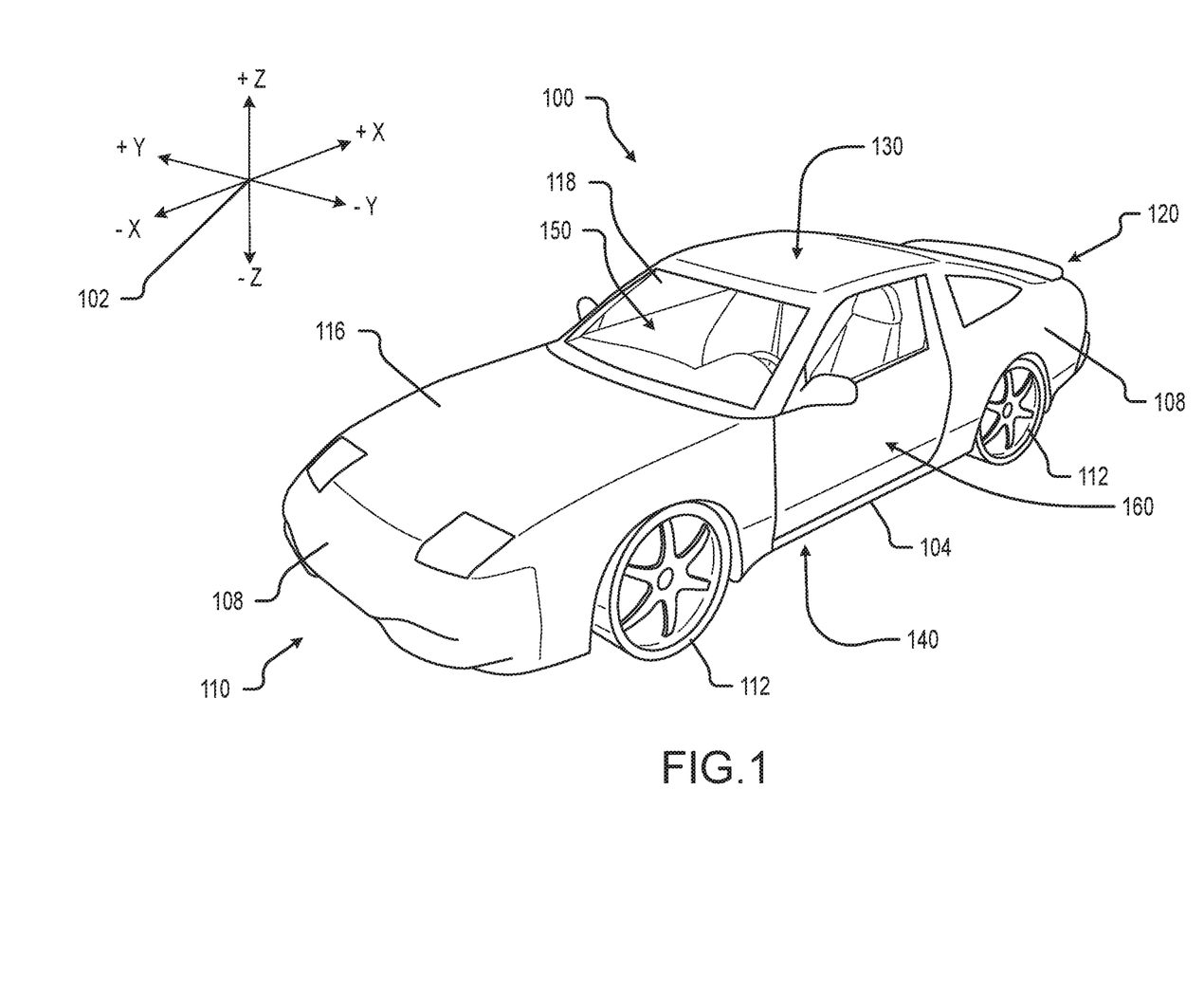
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Figure 2A:
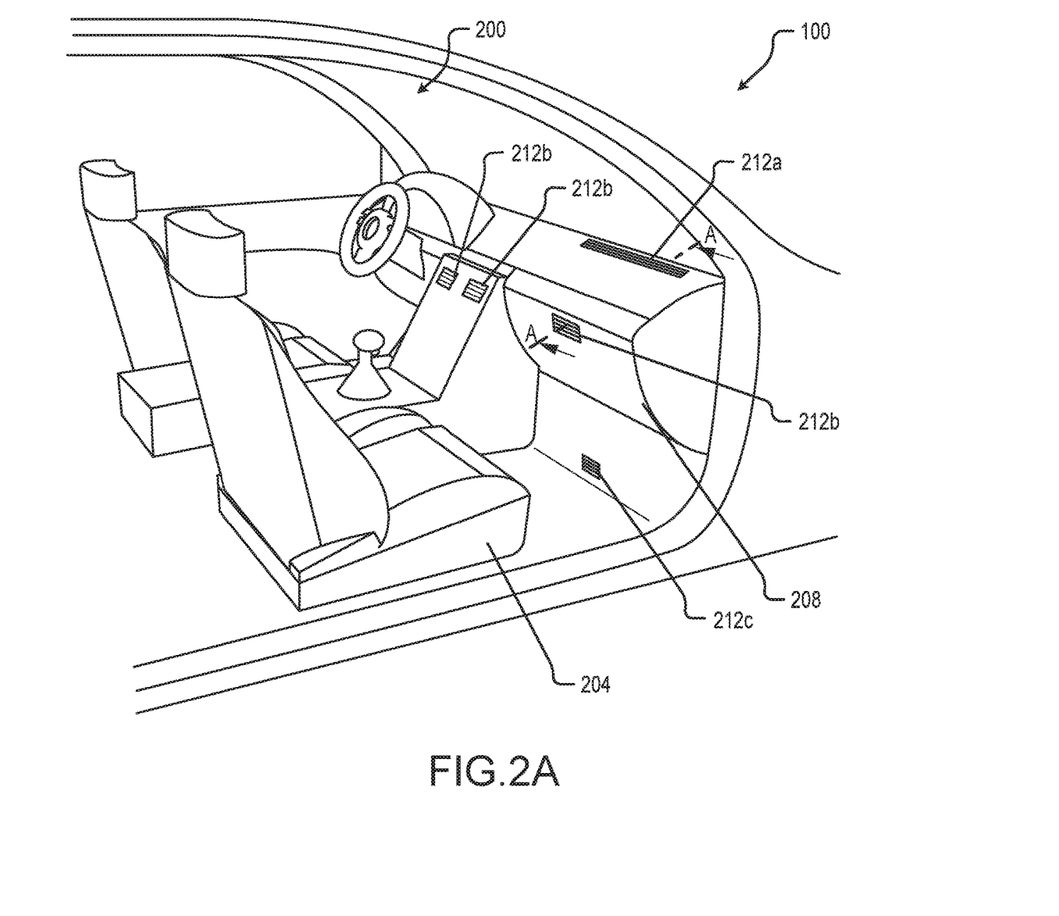
FIG. 2A shows a passenger compartment of a vehicle such as the vehicle shown in FIG. 1 in accordance with embodiments of the present disclosure.

Referring now to FIG. 2A, a vehicle passenger cabin 200 of a vehicle 100 according to embodiments of the present disclosure includes a passenger seat 204, and a dashboard or instrument panel or dash panel (all of which terms may be used interchangeably herein) 208. The dashboard may include one or more air registers or vents 212a, 212b, and 212c, through which heated, cooled, or unconditioned air may be introduced into the passenger compartment for climate control and ventilation purposes. The air vents 212a, 212b, and 212c cover apertures in one or more air ducts (not shown in FIG. 2) that channel fresh or recirculated air to or from an HVAC module (not shown in FIG. 2) of the vehicle 100, as appropriate, and to the air vents 212a, 212b, and 212c for introduction into the passenger cabin 200. One or more of the air vents may be positioned adjacent a windshield of the vehicle 100 for defrost purposes, as is the air vent 212a in FIG. 2. Others of the air vents may be positioned in the dashboard 208, for supplying air to the passenger cabin 200 at or near the head, neck, and/or torso of the occupants of the passenger cabin 200, as are the air vents 212b in FIG. 2. Still others of the air vents may be positioned at or near the floor of the passenger cabin 200, for supplying air to the passenger cabin 200 at or near the feet of the occupants of the passenger cabin 200, as is the air vent 212c. Any number of defrost air vents 212a, dash-level air vents 212b, and foot-level air vents 212c may be included in the passenger cabin 200. In some embodiments, air vents may be positioned at or near the sides of the dashboard 208 for defrosting one or more side windows of the vehicle 100; and in or near the ceiling of the vehicle 100 for discharging air onto occupants of the vehicle 100 from above.

In a vehicle having a second row of seats, air vents for discharging air onto occupants of the second row of seats are traditionally positioned, for example, in the ceiling of the vehicle, in a center console of the vehicle (e.g., a console positioned in between two front seats), and/or in the floor of the vehicle. In vehicles having more than two rows of seats, similar solutions are utilized for additional rows of seats behind the second row. Problematically, however, air vents positioned in the ceiling, in a center console, and/or in the floor of a vehicle are poorly positioned to provide air flow directly onto the face of an occupant of the second row, particularly as compared to air vents positioned on a dashboard immediately in front of a front seat. Air vents positioned on the dashboard immediately in front of a front seat are ideally positioned to provide air flow directly onto the face and/or throat of an occupant of the front seat. Moreover, because the dashboard has a fixed location, an air vent in the dashboard is always in the same position.

Traditional vehicles with traditional adjustable seats (which can be adjusted, for example, forward and backward, up and down, and to varying angles of recline) cannot position air vents directly in front of second-row seats (or of seats in additional rows) so as to direct air on the face and/or throat of second-row seat occupants, because such vents would have to be mounted in the adjustable seats immediately in front of the second-row seats (or of the seats in additional rows). A traditional adjustable seat, however, is not able to support normal ducting for an air vent directed at passengers located behind the seat while still maintaining the seat's ability to be adjusted. Even in an adjustable seat that has unconventional interior ducting feeding air to a seatback-mounted air vent, adjustments to such a seat result in movement of the air vent. Depending how the seat is adjusted, the air vent mounted therein could be moved into a position or orientation from which it is not able to direct air onto the face of the intended vehicle occupant. For example, the seat could be reclined to an angle that prevents the air vent from directing air onto the face and/or throat of the vehicle occupant intended to be serviced by the air vent.

The foregoing problem can be solved by using a fixed frame surrounding a movable seat structure. The fixed frame may support and/or surround a movable seat structure (including, for example, a movable seat back and a moveable seat bottom). The movable seat structure can thus be adjusted by an occupant thereof without affecting the position of the fixed frame.

Figure 2B:
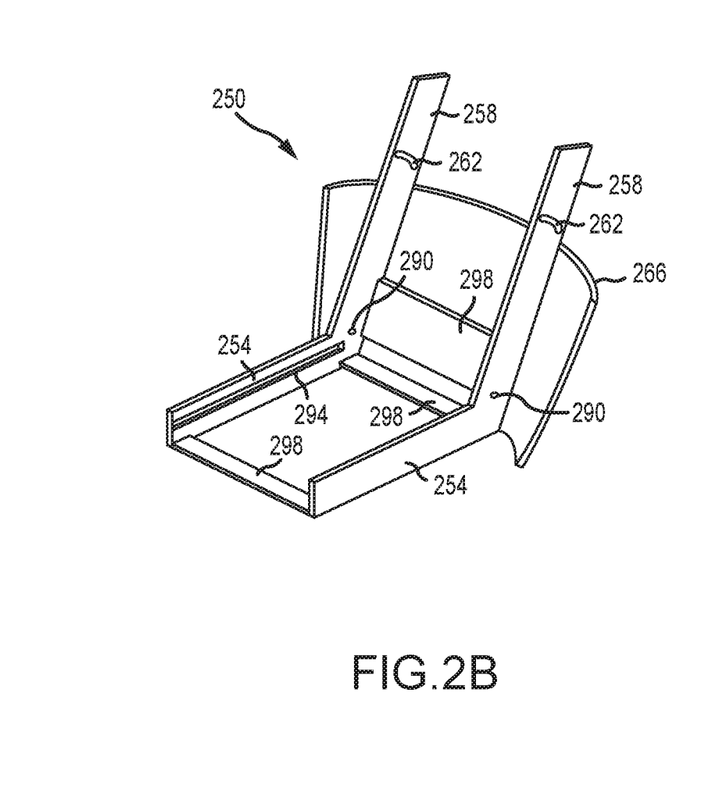
FIG. 2B shows a fixed frame according to embodiments of the present disclosure.

FIG. 2B illustrates a fixed frame 250 according to one embodiment of the present disclosure, which includes a pair of bottom frame elements 254 and a pair of back frame elements 258, which are secured to each other with a plurality of cross-members 298. Each of the back frame elements 258 comprises a hole 290 and a slot 262, while each of the bottom frame elements 254 comprises a track 294. A cover 266 may be secured to one or both of the back frame elements 258 and the bottom frame elements 254 to provide an aesthetically pleasing surface on the rearward side of the fixed structure seat. The cover 266 may be any desired shape and size, may be comprised of one or multiple individual pieces, and may comprise one or more of plastic, leather, fabric, fiberglass, carbon-fiber, or any other suitable material.

Either or both of the bottom frame elements 254 and the back frame elements 258 may be fixedly attached to a vehicle such as the vehicle 100. For example, the bottom frame elements 254 may be bolted, riveted, welded, or otherwise secured to the body structure of a vehicle 100, or to a riser of the vehicle 100 that is in turn secured to the body structure of the vehicle 100. The back frame elements 258 may also be bolted, riveted, welded, or otherwise secured to the body structure of a vehicle 100, or to a structure or member that is otherwise connected or secured to the body structure of the vehicle 100. The fixed frame 250 is manufactured to be substantially rigid, which rigidity may result from the material from which the fixed frame 250 is manufactured and/or the design of the fixed frame 250. In some embodiments, the fixed frame 250 is made of steel, aluminum, or other metals. In other embodiments, the fixed frame 250 is manufactured from one or more composite materials, such as a carbon fiber laminate. In still other embodiments, some or all of the fixed frame 250 may be manufactured from plastic.

Figure 2C:
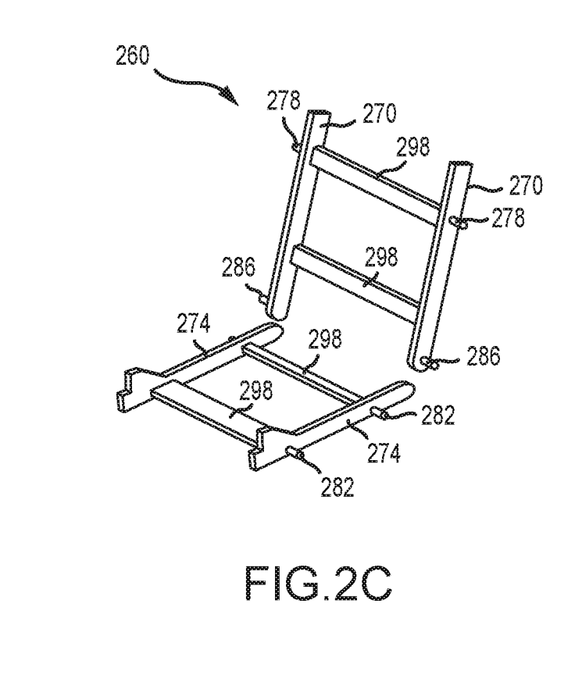
FIG. 2C shows a movable seat structure according to embodiments of the present disclosure.

FIG. 2C illustrates a movable seat structure 260, which fits within and is supported by the fixed frame 250. The movable seat structure 260 includes a pair of bottom supports 274 and a pair of back supports 270. The pair of bottom supports 274 are secured to each other with a plurality of cross members 298, and the pair of back supports 270 are secured to each other with a plurality of cross members 298. Additionally, a pin 286 extends outward from a lower end of each of the pair of back supports 270. The pins 286 are positioned to engage the holes 290 of the fixed frame 250, thus allowing the pair of back supports 270 to rotate around the pins 286. Another pin 278 extends outward from each back support 270, at a position, between the pin 286 and the upper end of the back support 270, that corresponds to the position of the slots 262 on the pair of back frame elements 258. The pins 278 thus engage the slots 262, which slots 262 allow the pair of back supports 270 to rotate between a reclined position and an upright position. Although not shown in FIG. 2C, any suitable mechanism may be used to hold the back supports 270 at a recline angle selected by a user of the movable seat structure 260, and to facilitate adjustment of the back supports 270 from one angle of recline to another. Additionally, although the embodiment of FIGS. 2B-2C utilizes a pin and slot configuration to permit the back supports 270 to recline relative to the back frame elements 258, in other embodiments other configurations and/or mechanisms may be used to enable reclining functionality of the back supports 270 relative to the fixed frame 250.

Also, a plurality of pins or wheels 282 are affixed to the outer side of each sliding member 274. These pins or wheels 282 engage the tracks 254 on the bottom frame elements 254 of the fixed frame 250, and allow the bottom supports 274 to slide forward or backward relative to the fixed frame 250. In other embodiments, other sliding mechanisms and/or configurations may be used to enable the sliding members 274 to move forward and backward relative to the fixed frame 250.

The pair of bottom supports 274, together with the cross members 298 secured thereto, support a seat cushion and/or other upholstery, as well as any additional structure needed to enable the pair of bottom supports 274 to support the weight of a person and/or to provide a comfortable seat for a person. The pair of bottom supports 274, together with the cross members 298 secured thereto, also support any pertinent accessories such as seat warming elements. Likewise, the pair of back supports 270, together with the cross members 298 secured thereto, support a back cushion and/or other upholstery, as well as any additional structure needed to enable the pair of back supports 270 to support the weight of a person and/or to provide a comfortable seat for a person. The pair of back supports 270, together with the cross members 298 secured thereto, also support any pertinent accessories such as seat warming elements.

The foregoing description of a fixed frame 250 and a movable seat structure 260 is provided by way of illustration and example only. The particular way or ways in which the movable seat structure 260 moves relative to the fixed frame 250, including the type of movement (e.g., rotation, translation) and mechanisms or other components that permit and facilitate such movement (e.g., pins and slots, pins or wheels and tracks) are not limited to the types of movement and mechanisms or other components described herein. Embodiments of the present disclosure may be manufactured in many ways, each of which is suitable for purposes of the present disclosure provided that the fixed frame is provided that is secured to the vehicle in which it is installed and that does not move when the movable seat structure is moved.

In some embodiments, a fixed frame may be entirely separate from a movable seat structure of a vehicle. For example, a fixed frame may at least partially surround a movable seat structure or even a more traditional adjustable seat, without supporting support the movable seat structure or adjustable seat and without moving when the movable seat structure or adjustable seat is adjusted. Such a fixed frame may be mounted directly to the vehicle body structure, or to a riser that is in turn mounted to the vehicle body structure. The fixed frame may be mounted at a position behind a front-row seat and forward of a second-row seat (e.g., between a front-row seat and a second-row seat) of a vehicle such as the vehicle 100. The fixed frame may have a height that is equal to at least one half of the height of the movable seat structure, so as to enable an air vent to be mounted on or near the fixed frame, as described below, in a position to enable the air vent to direct air onto the face and/or throat of an occupant of a second-row seat. Such a fixed frame may be utilized in the same manner as the fixed frame 250 described herein.

Figure 3:
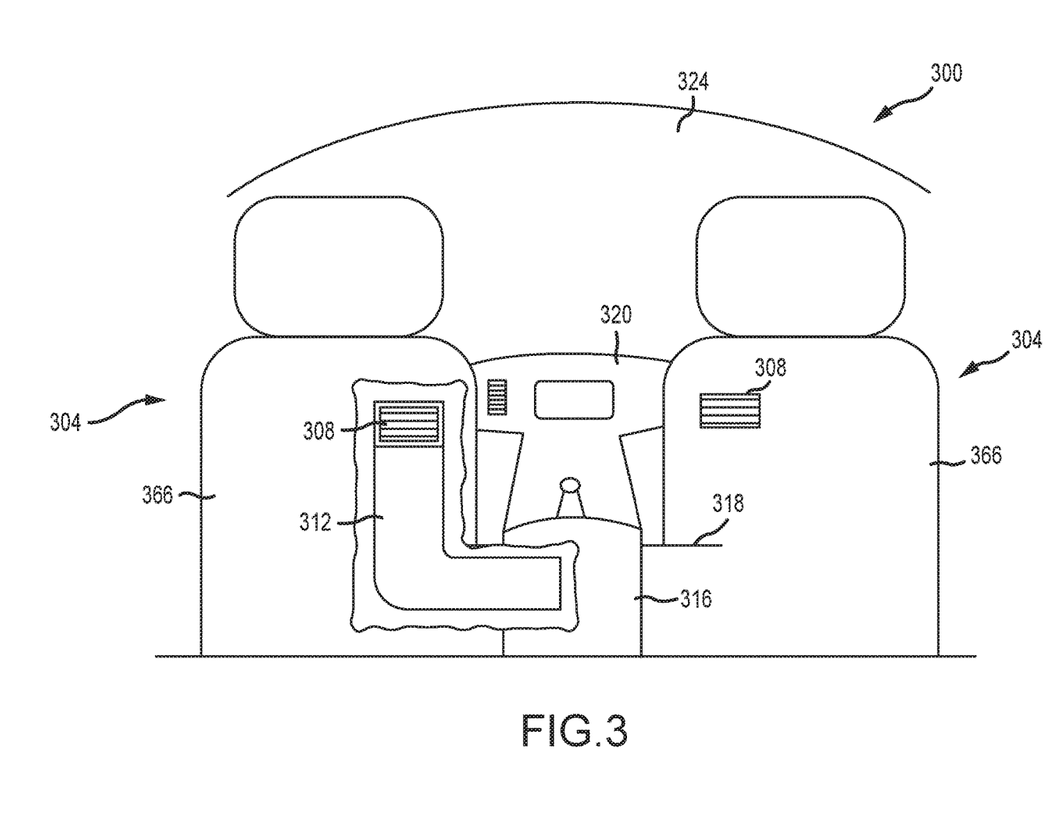
FIG. 3 shows a view of the back of front-row seats of a vehicle according to one embodiment of the present disclosure.

FIG. 3 shows the rear-facing side of two front-row seats 304, as the front-row seats 304 might be seen by an occupant of a second-row seat in a vehicle 300. The front-row seats 304 comprise a fixed frame such as the fixed frame 250, but the fixed frame is surrounded by an outer cover 366 (which may be the same as or similar to the outer cover 266), and therefore is not visible in FIG. 3. In some embodiments, the front-row seats may comprise traditional adjustable seats, and a fixed frame may be provided behind the traditional adjustable seats and in front of the second-row seats, which fixed frame may be at least partially surrounded by an outer cover 366. Positioned forward of the front-row seats 304 and visible in FIG. 3 are the dashboard 320 and windscreen 324 of a vehicle 300 in which the front-row seats 304 are installed. The vehicle 300 may be the same as or similar to the vehicle 100 described above.

Each of the front-row seats 304 comprises an air vent 308 positioned within the cover 366 so as to direct air onto the face and/or throat of an occupant of a second-row seat positioned behind each fixed structure seat 304. As with air vents known in the art, the air vents 308 may be adjustable between an open position and a closed position. The air vents 308 may further comprise adjustable vanes for directing the flow of air through the air vents 308 in a desired direction.

A center console 316 extends rearward from at or near the dashboard 320 to a point approximately as far back from the dashboard 320 as the rear side of the front-row seats 304. In the embodiment of FIG. 3, a duct 312 runs through the center console 316 from an HVAC module positioned at a forward location in the vehicle 300 (e.g., underneath the dashboard 320, or forward of a forward wall or divider separating a passenger compartment of the vehicle 300 from another compartment of the vehicle 300), and routes air to the air vent 308 of the left front-row seat 304. In some embodiments, a single duct passing through the center console 316 splits into two ducts, each of which routes air to one of the air vents 308. In other embodiments, each air vent 308 receives air through a separate duct 312 that runs through the center console 316 and to the air vent 308. A trim or other facia 318 may be used to cover the portion of the duct 312 that passes from the center console 316 to the front-row seat 304, so as to present a finished look to occupants of the vehicle 300.

The portion of the duct 312 that extends through the front-row seat 304 is supported by the fixed frame of the front-row seat 304. The duct 312 may be secured to the fixed frame of the front-row seat 304 with adhesive, mechanical fasteners, ties, or any other suitable device or means. Because the fixed frame and outer cover 366 of the front-row seat 304 do not move, the duct 312 may be made of a rigid, non-flexible material. Moreover, the fixed location of the fixed frame of the front-row seat 304 ensures that the air vent 308 will remain in the same position, from which it can direct air onto the face and/or throat of an occupant seated in a second-row seat behind the front-row seat 304. Further, the fixed location of the fixed frame of the front-row seat 304 allows the duct 312 to be precisely dimensioned to deliver air to the air vent 308. The fixed length and configuration of the air duct 312 also beneficially allows the HVAC system of the vehicle 300 to be tuned or otherwise adjusted to ensure that conditioned air reaches the air vent 308 at the desired temperature and with the desired pressure.

Figure 4:
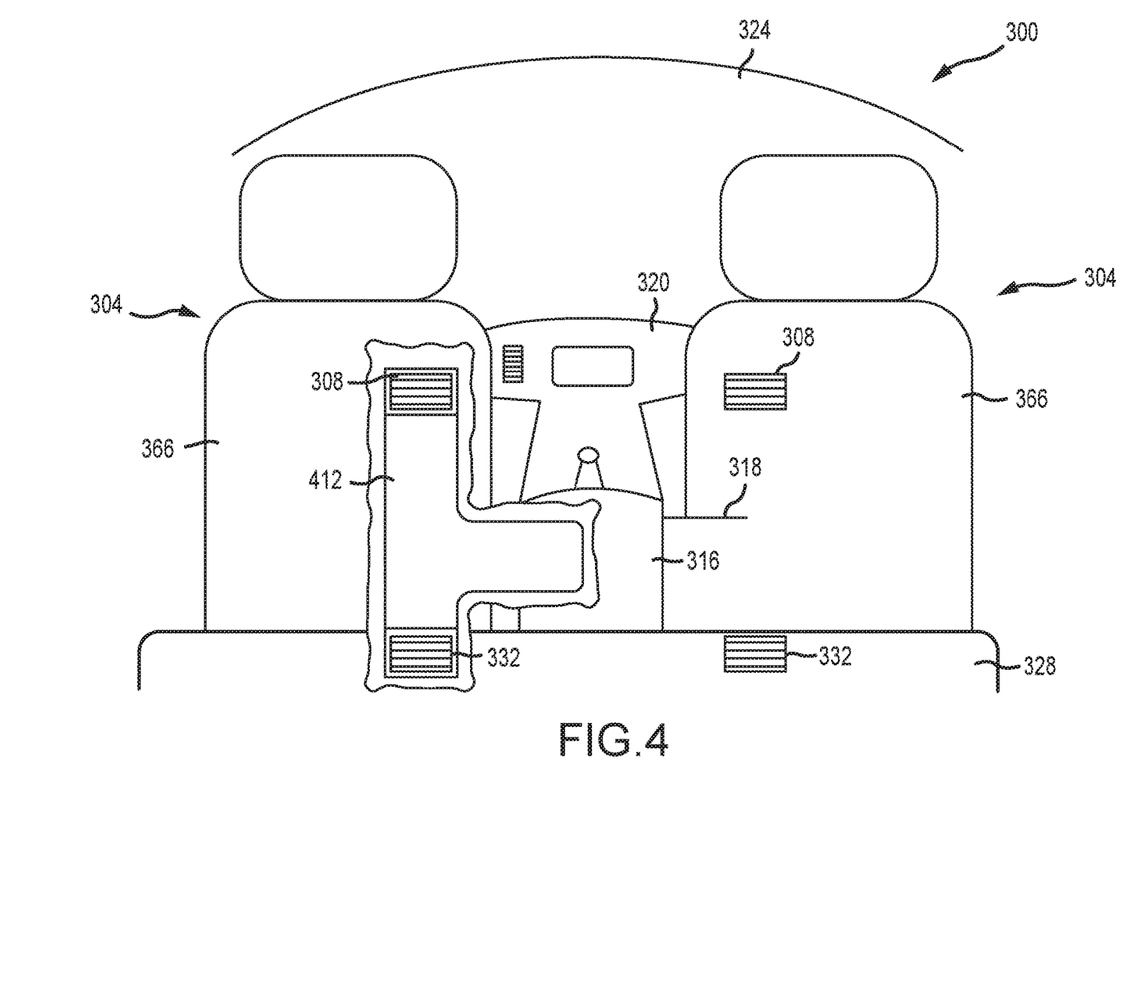
FIG. 4 shows a view of the back of front-row seats of a vehicle according to another embodiment of the present disclosure.

Referring now to FIG. 4, a vehicle 300 according to another embodiment of the present disclosure may comprise not only air vents 308 positioned on a rear-facing side of the front-row seats 304, but also a pair of vents 332 positioned in a step or riser 328 to which the seats 304 are mounted. In such embodiments, a duct 412 may be used to route air through the central console 316 and to the air vent 308 and the air vent 332. The air duct 412—which, other than routing air to both the air vent 308 and the air vent 332, may be the same as or similar to the air duct 312 described above—may route air to the air vents 308 and 332 of only one front-row seat 304, or the air duct 412 may route air to the air vents 308 and 332 of both front-row seats 304.

As with the air vents 308, the air vents 332 may be selectively adjustable between a closed and an open position, and may have adjustable vanes for adjusting the direction in which air blows from the air vents 332, so that an occupant being serviced by the air vents 308 and 332 may selectively adjust whether air is blown from one or both of the air vents 308 and 332 and in which direction.

Figure 5:
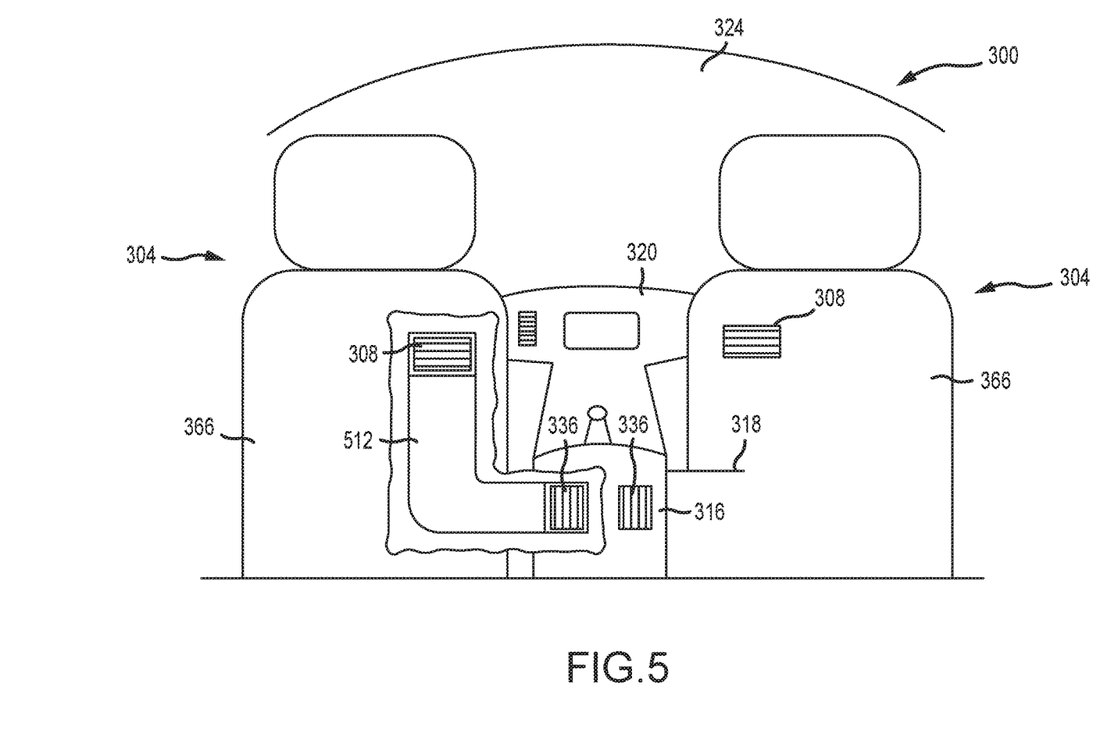
FIG. 5 shows a view of the back of front-row seats of a vehicle according yet another embodiment of the present disclosure.

Turning now to FIG. 5, a vehicle 300 according to some embodiments of the present disclosure may comprise air vents 336 positioned on a rear-facing surface of the central console 316 in addition to the air vents 308 positioned in the front-row seats 304. In such embodiments, the same duct 512 may route air from the HVAC module of the vehicle 300 to the air vents 336 and the air vents 308. Here again, the air vents 308 and 336 may be serviced by a single duct 512, or by a plurality of ducts 512. Except as described above, the duct 512 may be the same as or similar to the ducts 312, and the air vents 336 may be the same as or similar to the air vents 308 and 332.

Figure 6:
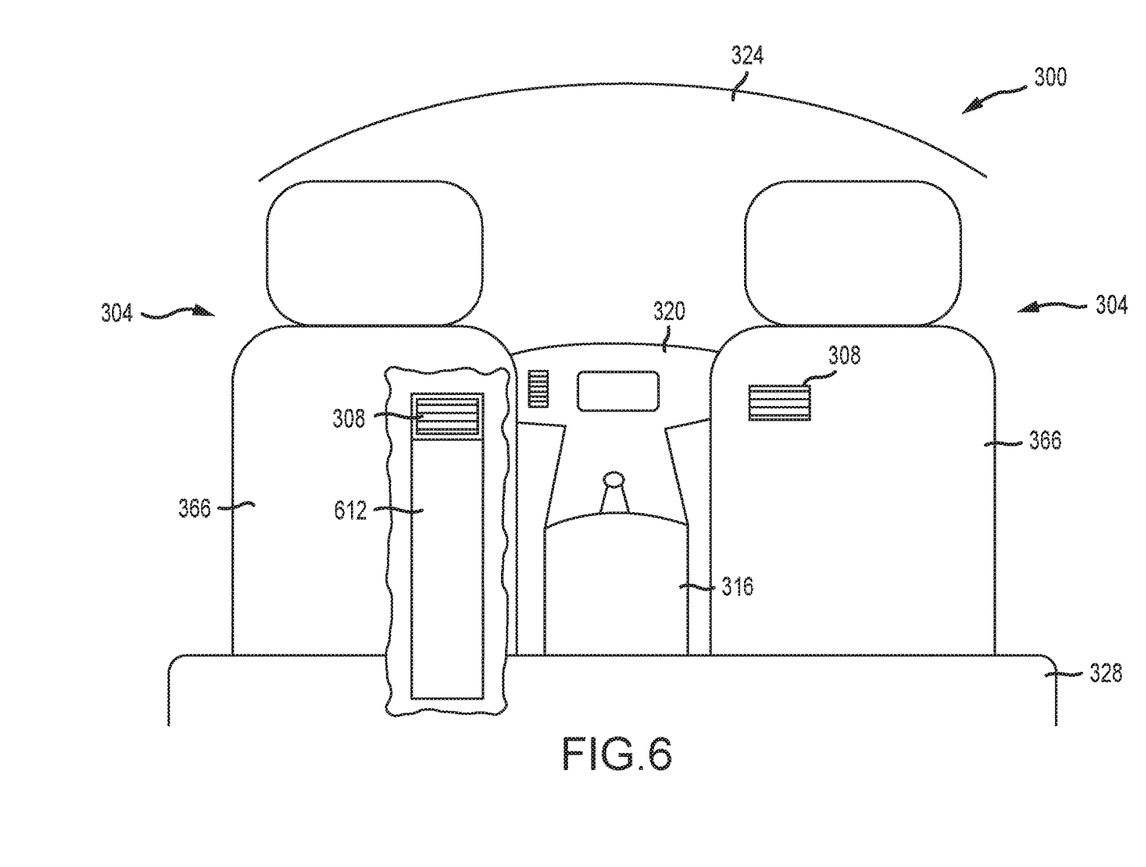
FIG. 6 shows a view of the back of front-row seats of a vehicle according to still another embodiment of the present disclosure.

FIG. 6 shows a vehicle 300 comprising a pair of front-row seats 304 mounted to a step or riser 328, according to another embodiment of the present disclosure. In this embodiment, the air vents 308 receive air through a duct 612 that is routed not through the central console 316, but through the step or riser 328. The routing of the duct 612 through the step or riser 328 rather than through the central console 316 may be desirable, for example, to provide greater space within the central console 316 for other vehicle components or for storage. In vehicles that do not have a step or riser 328 to which front-row seats are mounted, air vents such as the air vents 308 that are positioned on a back surface of such front-row seats may receive air through a duct similar to the duct 612, but that passes underneath a floor surface of the passenger compartment of the vehicle. Notably, the routing of the duct 612 through the step or riser 328 rather than through the central console 316 renders the trim or other facia 318 depicted in FIGS. 3-5, between the central console 316 and the front-row seats 304, unnecessary. Except as described above, the duct 612 may be the same as or similar to the duct 312.

Figure 7:
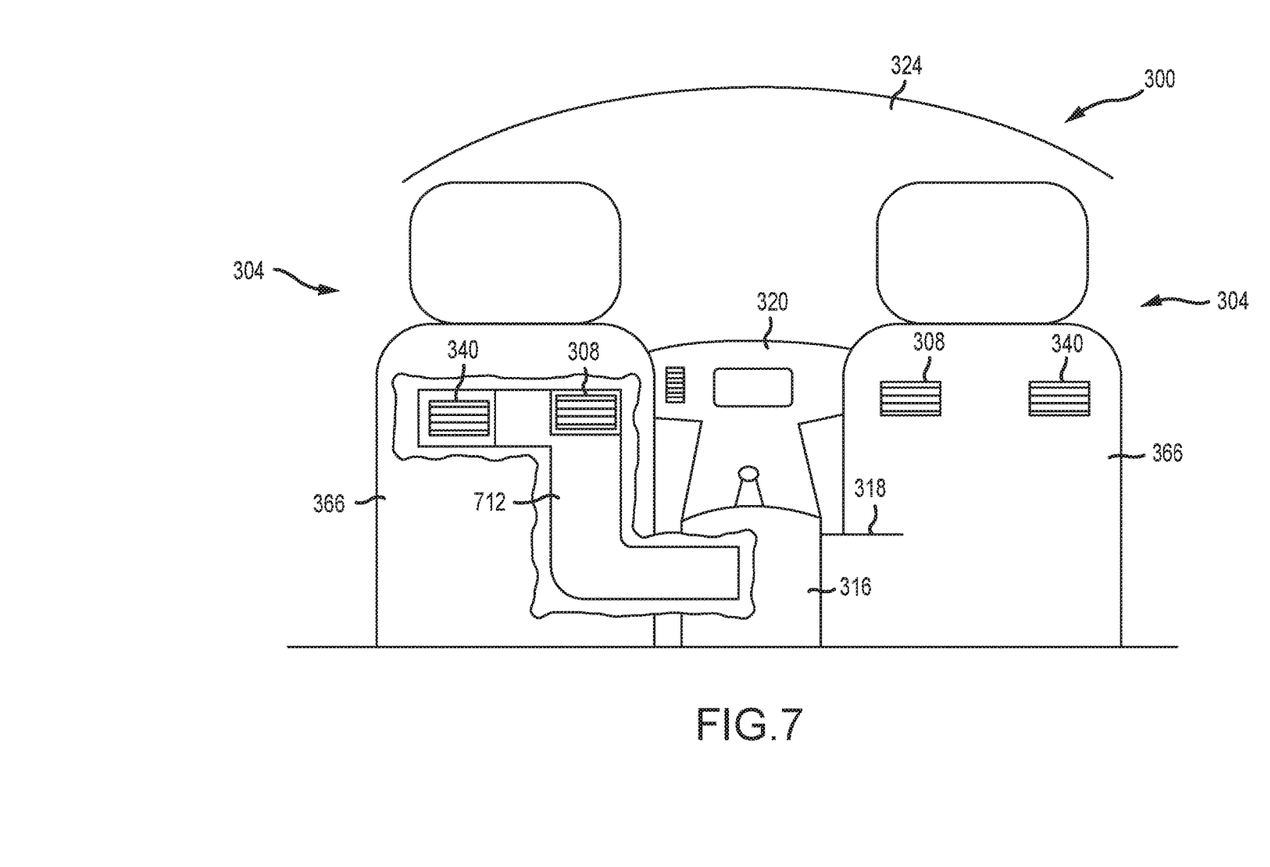
FIG. 7 shows a view of the back of front-row seats of a vehicle according to a further embodiment of the present disclosure.

FIG. 7 shows another embodiment of the vehicle 300, in which a plurality of air vents 308 and 340 are positioned on a rear surface of each front-row seat 304. In this embodiment, the air vents 308 and 340 receive air through a single duct 712, which is routed through the central console 316 in the same manner described above with respect to the duct 312. Indeed, except as described above, the duct 712 may be the same as or similar to the duct 312.

As persons of ordinary skill in the art will appreciate based on the foregoing disclosure, the dimensions of the ducts 312, 412, 512, 612, and 712 may be selected based on the number of air vents serviced thereby. For example, a duct 712 routing air to two air vents 308 and 340 may have larger cross-sectional dimensions than a duct 312 routing air only to one air vent 308, so as to the allow the duct 712 to carry sufficient air to provide the desired air pressure at each vent 308 and 340.

Additionally, while the embodiments described herein disclose a symmetrical arrangement of rear air vents from one side of the vehicle 300 to the other (e.g., the front-row seats 304 of FIG. 3 each comprise one air vent 308, while the front-row seats 304 of FIG. 7 each comprise one air vent 308 and one air vent 340), such symmetry is not required. Thus, the present disclosure encompasses embodiments in which one front-row seat 304 supports a first number of air vents such as the air vents 308 and 340, while another front-row seat 304 supports a second number of air vents different than the first number.

Further, air ducts such as the air ducts 312, 412, 512, 612, and 712 may be between one or more air vents in a front-row seat and the vehicle HVAC module in any manner. In addition to being routed, for example, through a center console of a vehicle, through a step or riser of a vehicle, or under a vehicle floor, the air ducts may also be routed above the vehicle floor, under a center console, through outboard side sills of the vehicle, through a vehicle sidewall, or otherwise.

Because embodiments of the present disclosure beneficially enable air vents to be ideally positioned for the comfort of second-, third-, or other non-front-row occupants of a vehicle 300, the number and/or size of air vents positioned on the dashboard 320 of a vehicle 300 may be reduced. In some traditional vehicles, excess air vents are provided on the dashboard to compensate for the reduced ability of the vehicle HVAC system to direct air onto rear seat occupants. In embodiments of the present disclosure, however, no such excess air vents are needed, thus freeing up space on and within the dashboard 320 for other vehicle components.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

A vehicle according to one embodiment of the present disclosure comprises: a seat comprising a fixed frame and a movable structure, the fixed frame comprising a bottom frame element and a back frame element, the fixed frame supporting the movable structure for movement relative to the fixed frame; and an air duct fixedly connected to the fixed frame, the air duct terminating in an air vent positioned on a rearward side of the seat at a height between a bottom of the fixed frame and a top of the fixed frame, wherein movement of the movable structure relative to the fixed frame has no effect on a position of the air vent relative to the fixed frame.

The vehicle may further comprise a center console adjacent the seat, and the air duct may extend through the center console. The seat may be mounted to a riser, and the air duct may extend underneath the riser. The seat may further comprise a cover that at least partially surrounds the fixed frame, and the air vent may be disposed within the cover. The air duct may supply air to a plurality of air vents. A plurality of air vents may be positioned on the seat, and each of the plurality of air vents may be in fluid communication with the air duct. The air duct may originate at an HVAC module. The air duct may pass through an outboard side sill of the vehicle. The vehicle may further comprise a plurality of seats, and each of the plurality of seats may comprise at least one air vent positioned on a rearward side of the seat at a height between a bottom of the fixed frame and a top of the fixed frame. The air duct may be in fluid communication with the at least one air vent positioned on the rearward side of each of the plurality of seats.

A vehicle seat according to another embodiment of the present disclosure comprises: a fixed frame comprising a bottom frame element and a back frame element; a movable structure supported by at least one of the bottom frame element and the back frame element, the movable structure configured to move relative to the fixed frame; an outer cover at least partially surrounding the fixed frame; an air duct extending between the outer cover and the fixed frame, and at least one air vent positioned in the outer cover at a height between a bottom of the fixed frame and a top of the fixed frame, the at least one air vent in fluid communication with the air duct; wherein the fixed frame is fixedly secured to a vehicle.

The vehicle seat may further comprise a plurality of air vents positioned in the outer cover. The air duct may originate at an HVAC module of the vehicle. The air duct may pass through a center console of the vehicle. The air duct may pass through an outboard side sill of the vehicle. The air duct may be in fluid communication with at least one air vent that is not positioned in the outer cover. The air duct may be secured to the back frame element with at least one of a mechanical fastener, an adhesive, and a tie. The bottom frame element may be fixedly secured to a riser of a vehicle.

According to still another embodiment of the present disclosure, a vehicle comprises: a first seat row comprising at least one seat, the seat comprising a fixed frame, a movable seat structure, and an outer cover, wherein the movable structure is configured to move relative to the fixed frame, and further wherein the fixed frame is fixedly secured to a vehicle frame member, the movable seat structure having a first height and the fixed frame having a second height equal to at least one half of the first height; a second seat row positioned behind the first seat row; an air duct extending between the fixed frame and the outer cover; and an air vent located within the outer cover, the air vent in fluid communication with the air duct and positioned to direct air toward the second seat row.

Movement of the movable seat structure may have no effect on the position or orientation of the air vent.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:
1. A vehicle, comprising:
 a seat comprising a fixed frame and a movable structure, the fixed frame comprising a bottom frame element and a back frame element and the movable structure comprising a bottom support and a back support, the fixed frame supporting the movable structure for movement relative to the fixed frame; and
 an air duct fixedly connected to the fixed frame, the air duct terminating in an air vent positioned on a rearward side of the seat at a height between a bottom of the fixed frame and a top of the fixed frame,
 wherein movement of the movable structure relative to the fixed frame has no effect on a position of the air vent relative to the fixed frame;
 wherein the back support is movable independently of the bottom support; and
 wherein the bottom support is movable in forward and backward directions independently of the back support.
2. The vehicle of claim 1, wherein the vehicle further comprises a center console adjacent the seat, and the air duct extends through the center console.
3. The vehicle of claim 1, wherein the seat is mounted to a riser, and the air duct extends underneath the riser.
4. The vehicle of claim 1, wherein the seat further comprises a cover that at least partially surrounds the fixed frame, and the air vent is disposed within the cover.
5. The vehicle of claim 1, wherein the bottom support comprises a front edge distal from the back support and a rear edge proximate the back support, and further wherein when the bottom support moves forward independently of the back support, a distance between the rear edge and the back support increases.
6. The vehicle of claim 1, wherein a plurality of air vents is positioned on the seat, and each of the plurality of air vents is in fluid communication with the air duct.
7. The vehicle of claim 1, wherein the air duct originates at an HVAC module.
8. The vehicle of claim 1, further comprising a plurality of seats, each of the plurality of seats comprising at least one air vent positioned on a rearward side of the seat at a height between a bottom of the fixed frame and a top of the fixed frame.
9. The vehicle of claim 8, wherein the air duct is in fluid communication with the at least one air vent positioned on the rearward side of each of the plurality of seats.
10. The vehicle of claim 1, further comprising a pair of slots on the back frame element of the fixed frame, wherein a pair of pins on the back support of the movable structure engage the pair of slots to allow the back support to move, independently of the bottom support, between a reclined position and an upright position relative to the back frame element.

11. A vehicle seat comprising:
  a fixed frame comprising a bottom frame element and a back frame element;
  a movable structure comprising a bottom support and a back support and supported by at least one of the bottom frame element and the back frame element, the movable structure configured to move relative to the fixed frame, wherein the back support is movable independently of the bottom support and the bottom support is movable in forward and backward directions independently of the back support;
  an outer cover at least partially surrounding the fixed frame;
  an air duct extending between the outer cover and the fixed frame, and
  at least one air vent positioned in the outer cover at a height between a bottom of the fixed frame and a top of the fixed frame, the at least one air vent in fluid communication with the air duct;
  wherein the fixed frame is fixedly secured to a vehicle.

12. The vehicle seat of claim 11, further comprising a plurality of air vents positioned in the outer cover.

13. The vehicle seat of claim 11, wherein the air duct originates at an HVAC module of the vehicle.

14. The vehicle seat of claim 13, wherein the bottom support comprises a front edge distal from the back support and a rear edge proximate the back support, and further wherein when the bottom support moves forward independently of the back support, a distance between the rear edge and the back support increases.

15. The vehicle seat of claim 11, wherein the air duct is in fluid communication with at least one air vent that is not positioned in the outer cover.

16. The vehicle seat of claim 11, wherein the air duct is secured to the back frame element with at least one of a mechanical fastener, an adhesive, and a tie.

17. The vehicle seat of claim 11, wherein the bottom frame element is fixedly secured to a riser of a vehicle.

18. The vehicle of claim 11, further comprising a pair of slots on the back frame element of the fixed frame, wherein a pair of pins on the back support of the movable structure engage the pair of slots to allow the back support to move, independently of the bottom support, between a reclined position and an upright position relative to the back frame element.

19. A vehicle comprising:
  a first seat row comprising at least one seat, the seat comprising a fixed frame, a movable seat structure, and an outer cover, wherein the movable structure comprises a bottom support and a back support, the bottom support configured to move in forward and backward directions relative to the fixed frame and independently of the back support, the back support configured to move independently of the bottom support, and further wherein the fixed frame is fixedly secured to a vehicle frame member, the movable seat structure having a first height and the fixed frame having a second height equal to at least one half of the first height;
  a second seat row positioned behind the first seat row;
  an air duct extending between the fixed frame and the outer cover; and
  an air vent located within the outer cover, the air vent in fluid communication with the air duct and positioned to direct air toward the second seat row.

20. The vehicle of claim 19, wherein the bottom support comprises a front edge distal from the back support and a rear edge proximate the back support, and further wherein when the bottom support moves forward independently of the back support, a distance between the rear edge and the back support increases.

* * * * *